US012665783B2

(12) United States Patent
Da Silva Esteves et al.

(10) Patent No.: US 12,665,783 B2
(45) Date of Patent: Jun. 23, 2026

(54) CAN TRANSCEIVER MONITOR

(71) Applicant: BOSCH CAR MULTIMEDIA PORTUGAL, S.A., Braga (PT)

(72) Inventors: Marco António Da Silva Esteves, Braga (PT); Emanuel José Rodrigues Da Silva, Covelas (PT); José Rui Amorim Gomes, Braga (PT)

(73) Assignee: BOSCH CAR MULTIMEDIA PORTUGAL, S.A., Braga (PT)

( * ) Notice: Subject to any disclaimer, the term of this patent is extended or adjusted under 35 U.S.C. 154(b) by 303 days.

(21) Appl. No.: 18/687,399

(22) PCT Filed: Dec. 21, 2021

(86) PCT No.: PCT/IB2021/062119
§ 371 (c)(1),
(2) Date: Feb. 28, 2024

(87) PCT Pub. No.: WO2023/118931
PCT Pub. Date: Jun. 29, 2023

(65) Prior Publication Data
US 2024/0388468 A1 Nov. 21, 2024

(30) Foreign Application Priority Data
Dec. 21, 2021 (PT) ........................................ 117655

(51) Int. Cl.
*H04L 12/417* (2006.01)
*H04L 12/40* (2006.01)

(52) U.S. Cl.
CPC .. *H04L 12/417* (2013.01); *H04L 2012/40215* (2013.01)

(58) Field of Classification Search
CPC ............ H04L 12/417; H04L 12/40215; H04L 2012/40215
See application file for complete search history.

(56) References Cited

U.S. PATENT DOCUMENTS

| | | | |
|---|---|---|---|
| 2010/0082805 A1 | 4/2010 | Orton et al. | |
| 2016/0164718 A1 | 6/2016 | Choi et al. | |
| 2019/0323836 A1 | 10/2019 | Chen et al. | |
| 2021/0400056 A1* | 12/2021 | Klösters | H04L 63/123 |
| 2022/0417057 A1* | 12/2022 | Wang | G06F 13/4063 |

OTHER PUBLICATIONS

International Search Report and Written Opinion for Corresponding International Application No. PCT/IB2021/062119, 10 pages, Sep. 15, 2022.

* cited by examiner

*Primary Examiner* — Brian T Le
(74) *Attorney, Agent, or Firm* — LUCAS & MERCANTI, LLP

(57) ABSTRACT
A CAN Transceiver monitor configured to perform operational tests without polluting the data transfer bus with test messages, while maintaining the CAN controller without any error flag triggered and with the message sent validated. Since the monitor handles the testing and cuts the connection to the network, none of the test messages can reach the network and therefore cause unnecessary bus load.

8 Claims, 1 Drawing Sheet

200

CAN TRANSCEIVER MONITOR

CROSS-REFERENCE TO RELATED APPLICATIONS

This application is a 371 of PCT/IB2021/062119, filed Dec. 21, 2021, which claimed the priority of Portuguese Patent Application No. 117655, filed Dec. 21, 2021, the contents of each of which are incorporated herein by reference.

TECHNICAL FIELD

The present invention describes a CAN Transceiver monitor configured to perform operational tests without polluting the data transfer bus with test messages, while maintaining the CAN controller without any error flag triggered and with the message sent validated.

BACKGROUND ART

The communication protocols used in modern vehicles can be figuratively considered as the central nervous system of it. Just like in humans, where this system is crucial for the perception of surrounding environment, in a vehicle the central nervous system is carrying enormous quantities of critical data of extreme importance for the decision-making process. As it can be concluded, the entire exchange of data present in vehicle depends on the optimal operation of the used protocols ensuring that are all the mechanisms of the vehicle are properly implemented and operationally used.

The most common communication protocol used in present vehicles is the Controller Area Network (CAN). When translated to a network stack according with ISO 11898 this protocol can be represented by three layers: Application Layer, Data Link layer and the Physical Layer. At the Application Layer is where the DSP or the microcontroller responsible for interacting with the CAN device module are represented. The Data Link layer represents the CAN controller, which is responsible for connecting the data to the protocol in terms of sending, receiving and validating the data. This layer already comprises mechanisms such as error correction codes that allows to check the integrity of data sent or received. Finally, yet importantly, the physical layer, is composed by the actual hardware needed to perform the communications. At this layer level there are less mechanisms ensuring proper operation.

On CAN communications, the transceiver plays an irreplaceable role, being indispensable to convert the transmission lines into differential lines in order to ensure better reliability of the whole communication. Nonetheless, the transceiver usually is not capable of self-testing or self-checking for problems that might occur. Alternatively, CAN controllers possess some methods to monitor itself, and in some cases, detect the most frequent hardware-errors in the wiring of CAN Networks.

Looking into the CAN controllers and its capabilities, there are two types of standalone CAN controllers, with or without integrated CAN transceivers.

The CAN controllers without transceivers, normally have internal functions as self-test, or local testing, that allow to understand if the CAN controller is working properly. However, it is not possible to deduce nothing about the transceiver itself, since for such tests, the lines to the transceiver are not used. There is also a test called global test that in a running system a CAN acknowledge is needed, this means that it would be another CAN controller that responds in the ACK.

The more complete package of CAN controllers coupled with CAN transceivers may comprise the following bus failure diagnostic methods:

CAN High and VBAT: communication still possible, "hidden" bus failure;

CAN High and VCC: communication still possible, "hidden" bus failure;

CAN High and GND: communication not possible;

CAN Low and VBAT: communication not possible;

CAN Low and VCC: communication not possible;

CAN Low and GND: communication still possible, "hidden" bus failure.

The "hidden" bus failures are basically short-circuits between the CAN High and VBAT, between the CAN High and VCC and between the CAN Low and GND. They are normally tolerated by the CAN high-speed physical layer, where the communication might still be possible. The bus failure diagnosis aims to detect such failure conditions and signal them to the application microcontroller. Of the above described methods, a short-circuit between CAN High and CAN Low or line interruption failures are not detected and would require external checking methods.

CAN Physical Layer is composed of: Physical Signaling (which includes bit encoding/decoding, timing and synchronization), Physical Medium Attachment (CAN Transceiver) and Medium Dependent Interface lines). (Bus From those three components, only the first one, the Physical Signaling, is assured by the CAN controller, while the last two components do not possess sure-fire methods of being verified. In addition, most of known and used techniques consist of disconnecting the transceiver from the bus lines in order to verify their electrical properties or detecting a problem with a node in the bus network.

In resume, known state-of the art technologies do not provide a clear way to perceive where the origin of the problem when an error message occurs. It can be from the CAN Controller, CAN transceiver or any of the network nodes.

They also do not provide a non-intrusive way to monitor the CAN transceiver. This means there is no solution to evaluate the State of the CAN transceiver without disassemble it from the unit.

Finally, there are no known methods that involve measuring the voltage supplies on the transceiver in a conclusive manner, since there are several "hidden" problems that cannot be directly accessed and might hide detectable problems in the CAN transceiver unit With that being said, the problem that the present invention aims to solve consists in developing a solution for verifying the CAN physical layer, more particularly the CAN transceiver, since the bus line when it is not working correctly is due to the fact that the lines are cut or in short circuit, and for that scenario, the CAN controller can signal the problem.

SUMMARY

The present invention describes a CAN Transceiver monitor comprising two CAN inputs, CAN H input and CAN L input; two CAN outputs, CAN H output and CAN L output; a CAN type selector; and a test enable port; wherein the test enable port is configured to enable the monitor to perform in-line and real time testing of the two CAN inputs while ensuring continuous an uninterrupted data flow of the two CAN inputs to the two CAN outputs.

In a proposed embodiment of present invention, the CAN Transceiver monitor is configured to be installed in series in a CAN bus line comprising a CAN H line and a CAN L line.

Yet in another proposed embodiment of present invention, the CAN type selector is configured to commute the monitor between two CAN types, CAN classic and CAN-FD.

Yet in another proposed embodiment of present invention, the real time testing of the two CAN inputs comprises determining if a CAN transceiver connected to the bus line is correctly transmitting and receiving CAN data frames.

Yet in another proposed embodiment of present invention, the CAN Transceiver monitor further comprises at least a test circuit, an ACK detection circuit and a ACK response circuit.

Yet in another proposed embodiment of present invention, the test circuit comprises electronic and additional logic circuits configured to commute between a testing mode and a default operation mode.

Yet in another proposed embodiment of present invention, the ACK detection circuit comprises logic circuits configured to determine the position of an ACK bit within a CAN data frame.

Yet in another proposed embodiment of present invention, the ACK response circuit is configured to output an ACK bit of the CAN data frame in the CAN bus line for a set duration of time.

GENERAL DESCRIPTION

The present invention describes a CAN Transceiver monitor configured to perform operational tests without polluting the data transfer bus with test messages, while maintaining the CAN controller without any error flag triggered and with the message sent validated.

The difference between the known existing solutions and the presently proposed resides in that most of the techniques used so far are testing the transceiver in an "offline" method, while the proposed solution of current invention, can perform it in-line and in real time. In addition, the proposed solution can perform deterministic tests to the transceiver either in Controller Area Network (CAN) or Controller Area Network Flexible Data-Rate (CAN FD). In other words, the action performed will return a result specifying if the transceiver is working as it should or not, in contrast with the existing solutions where it is only disclosed that a problem exists in the physical layer but it is not possible to identify if the problem resides in the transceiver, bus lines or even in other CAN node.

The core problem it aims to solve is related with current set ups of CAN Controller coupled to a CAN transceiver which do not have a method to assess the state of the CAN transceiver, this means that is not possible to know when a message error occurs, where is the origin of the problem either it be from the CAN transceiver of other nodes or even the CAN controller. Other testing methods involve disassembling the CAN transceiver for voltage and electric current testing; however, the present invention is a no intrusive set up that performs an evaluation to the CAN transceiver and returns feedback to the microcontroller.

A CAN message can be composed of 5 fields, excluding the start and the end of frame, which include arbitration, control, data and CRC fields, whose data treatment is ensured by the transmitting node, i.e., the emitting CAN controller and CAN transceiver, and the ACK field whose data treatment is ensured by the receiving node, i.e., the receiving CAN controller and CAN transceiver. However, since during the performed test procedures, the node would be isolated from the CAN bus lines, there would be no response. That response becomes responsibility of the node itself.

The main objective of this invention is therefore to acknowledge the transmission of a classic CAN bus or CAN FD bus message/data frame via the acknowledge bit without having the bus line connected to the main CAN bus line. This allows to perform the referred testing without polluting the bus itself.

BRIEF DESCRIPTION OF THE DRAWINGS

For better understanding of the present application, figures representing preferred embodiments are herein attached which, however, are not intended to limit the technique disclosed herein.

FIG. 1—represents a block diagram that depicts the proposed currently implemented solution in the physical layer of a CAN protocol. The reference numbers are related to:

20—CAN controller;
21—Rx Line;
22—Tx Line;
30—CAN Transceiver;
31—CAN H line;
32—CAN L line;
40—CAN Transceiver Monitor;
41—CAN H Input;
42—CAN L Input;
43—CAN H output;
44—CAN L output;
45—power supply A;
46—power supply B;
47—CAN type selector;
48—test enable port;
49—CAN bus line.

Figure 1:
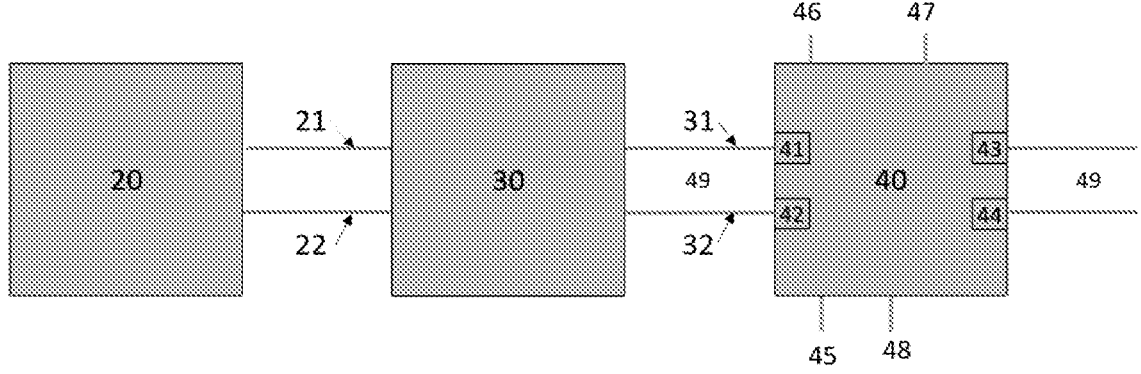
Figure 2:
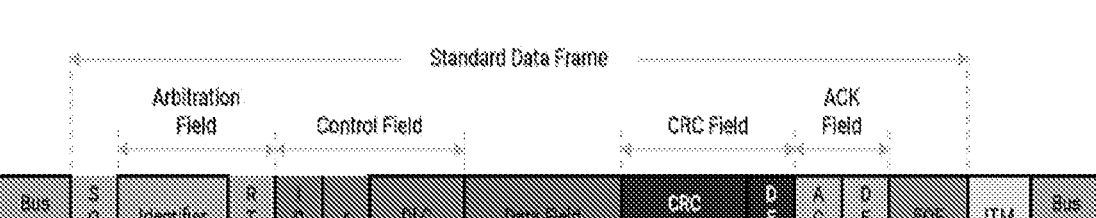

FIG. 2—depicts the key components of a CAN standard data frame (200), composed of a composed of 5 fields, excluding the start and the end of frame (SOF, EOF), which include arbitration field, control field, data field, CRC field and ACK field.

DESCRIPTION OF EMBODIMENTS

With reference to the figures, some embodiments are now described in more detail, which are however not intended to limit the scope of the present application.

The developed transceiver monitor (40) is embedded in series in a CAN bus line (49) after a CAN transceiver (30), i.e., in the outputs of the CAN transceiver (30). The proposed monitor (40) comprises at least 8 inputs, with two of them ensuring the power supply with the required operating voltages, power supply A (45) and power supply B (46), particularly and respectively Vdd and the other Vss (Ground) within an expected and ideal range comprised in between 5V to 12V. Embedded microchips usually do not have wide ranges of operation voltage. This is also important to reduce extra protection hardware that otherwise would have to be included. The CAN_H input (41), CAN_L input (42), CAN_H output (43) and CAN_L output (44) are part of the CAN bus line (49) and are required to decipher the transmitted CAN data frames (200) as well as to ensure the transmission of said data frames (200) to the bus line (49) in case of no test operation. The test enable port (48) input is configured to highjack the data frames (200) for testing purposes or, by default, to propagate the data frames (200) present on the CAN input signals (31, 32) to the CAN bus line (49). The CAN type selector (47) is configured to discern and commute the analysis of the monitor (40) between CAN classic and CAN-FD (CAN with flexible data rates up to 8 Mbps), allowing the support of both type of operations. This is required since CAN data frames (200) in both CAN classic and CAN-FD are essentially different in format and size. On the IC's the change between analyzing CAN frames and CAN-FD frames is the number of expected counts, which is higher in CAN-FD since the header files are also bigger.

The CAN Transceiver monitor (40) comprises internally three main components:

Test Circuit—electronic and additional logic circuits configured to shift between testing mode and default operation mode, ensuring the normal connection to the CAN bus line and transmission of the data frames (200).

ACK detection circuit—logic circuits in charge for determining the position of the ACK bit within the CAN data frame (200). The expected message has a predetermined layout that enables counting transitions and deduce its current and, therefore, determine where the Ack bit located at.

ACK response circuit—circuit required to place the dominant ACK field of the data frame (200) in the CAN bus line (49) for a set duration of time. The level is dragged to a dominant level for the duration of the CAN bit according to the current bit timing.

There are two methods to achieve the resulting above mentioned signal in the CAN bus line (49). One of them involves the use of flip-flop counters and the other resorts to the use of capacitors.

The first approach, based on the use of flip-flop counters, comprises also additional electronic logic components to detect different crucial points, and using the rising edges of the digital signals in order to detect bit duration. The proposed arrangement was performed with JK Flip Flops for synchronization purposes, but, in practical terms, any type of logic flip flops organized into a counter can be used. The auto bit duration detection allows for a more flexible approach not dependent on the data transfer baud rate used on the CAN bus line (49). This means that this approach is compatible with any data transfer baud rate used in the CAN H line (31). The solution comprises a high-speed clock that allows the counter to operate faster that the CAN bit time. This feature allows to know which bit is a bit time, and, with that, deduce the current baud rate. Therefore, it works as an auto baud-rate detector.

For support of the CAN L line (32) it is required extra bits on the flip-flop counters that can be added at any time. Both circuits of ACK detection and ACK response use counter logic. This first approach is not dependent on the type of CAN when reading the lines. However, the lines (31, 32) themselves are essential for detecting rising edges and descending edges. To note that the operations on the CAN High (31) and CAN Low (32) lines are mirrored, being the reason that would require a slightly different counter management, which can be added for redundancy purposes and increased reliability.

The second approach uses the same circuit for ACK detection of the data frame (200) whilst it uses combinational logic combined with electronics some such as transistors, capacitors and resistors. The referred combinational logic is used to identify the latest rising edges of the signal in way to charge the capacitors that later are discharged in order to set the ACK bit. The rising edge of the known frame position is used to trigger the charging of the capacitor. The charge will correspond to the duration of an Ack response. So, when it is time to acknowledge the frame, it will do so with the correct duration. The transistors in this ACK creation circuit act like switches turning on and off, driving the CAN lines between dominant and recessive states, depending on the result wanted. In matters of the basic electronics, which are the resistors and the capacitors, they must be designed according with the required data transfer baud rate. The RC circuit has a time constant for charging and discharging, and it is expected that the discharging would take just the right amount of time required for the specific bit timing of the acknowledge. The major step back on this implementation is that the ACK bit duration is designed according with the values of the capacitors and resistors used. In other words, this implementation once designed, it only works with a fixed data transfer baud rate. This can be understood as an alternative, once using a specific RC circuit for a specific baud rate would also reduce the production costs of this monitor. So, it can be also implemented in more specialized and low-cost applications. To note that the counter alternative does not have this drawback. It is not flexible when compared to the one presented before. On the other hand, this ACK response circuit uses less electronic components which could be advantageous in matters of PCB space.

The invention claimed is:

1. A Controller Area Network (CAN) Transceiver monitor comprising:

two CAN inputs including CAN H input and CAN L input;

two CAN outputs including CAN H output and CAN L output;

a CAN type selector;

a test enable port;

at least a test circuit, an ACK detection circuit and an ACK response circuit;

the CAN Transceiver monitor is configured to install in series in a CAN bus line comprising a CAN H line and a CAN L line, after a CAN transceiver;

wherein the test enable port is configured to enable the monitor to perform in-line and real time testing of the two CAN inputs while ensuring continuous and uninterrupted data flow of the two CAN inputs to the two CAN outputs, the CAN H input, the CAN L input, the CAN H output and the CAN L output are part of a CAN bus line and are required to decipher transmitted CAN data frames as well as to ensure transmission of said data frames to the CAN bus line in case of no test operation, the test enable port is configured to highjack the data frames for testing purposes or, by default, to propagate the data frames present on the two CAN input signals to the CAN bus line, wherein a test circuit comprises electronic and additional logic circuits configured to commute between a testing mode and a default operation mode, a ACK detection circuit comprises logic circuits configured to determine a position of an ACK bit within a CAN data frame, and the ACK response circuit is configured to output an ACK bit of a CAN data frame in the CAN bus line for a set duration of time.

2. The CAN Transceiver monitor according to claim 1, wherein the CAN type selector is configured to discern and commute the analysis of the CAN Transceiver monitor between two CAN protocol types including CAN classic and CAN-FD.

3. The CAN monitor according to claim 1, wherein the real time testing of the two CAN inputs comprises determining if a CAN transceiver connected to a bus line is correctly transmitting and receiving CAN data frames.

4. The CAN Transceiver monitor according to claim 1, wherein the ACK response circuit is configured to acknowledge the transmission of a CAN classic bus or CAN FD bus message/data frame via the acknowledge bit without having the CAN bus line connected to a main CAN bus line.

5. The CAN Transceiver monitor according to claim 1, wherein the ACK detection circuit and the ACK response circuit use counter logic.

6. The CAN Transceiver monitor according to claim 5, wherein a solution comprises a high-speed clock that allows the counter logic to operate faster than the CAN bit time, so as to know which bit is a bit time and, with that, deduce the current baud rate, thereby working as an auto baud-rate detector.

7. The CAN Transceiver monitor according to claim 1, wherein the ACK response circuit uses combinational logic combined with transistors, capacitors and resistors, the combinational logic being used to identify the latest rising edges of the signal in way to charge the capacitors that later are discharged in order to set the ACK bit.

8. The CAN Transceiver monitor according to claim 7, wherein the charge corresponds to the duration of an ACK response, so that, when it is time to acknowledge the frame, the ACK response circuit acknowledges the frame with the correct duration.

* * * * *